United States Patent [19]

Inui et al.

[11] Patent Number: 5,455,019

[45] Date of Patent: Oct. 3, 1995

[54] CONTINUOUS PROCESS FOR PREPARING ALUMINUM HYDROXIDE

[75] Inventors: Masamichi Inui; Yasushi Teshima; Yoshiaki Takeuchi, all of Niihama, Japan

[73] Assignee: Sumitomo; Chemical Company, Limited, Osaka, Japan

[21] Appl. No.: 170,854

[22] Filed: Dec. 21, 1993

[30] Foreign Application Priority Data

Dec. 25, 1992 [JP] Japan .................................. 4-346024
Jun. 18, 1993 [JP] Japan .................................. 5-147496

[51] Int. Cl.$^6$ .................................................. C01F 7/02
[52] U.S. Cl. ............................................ 423/629; 423/625
[58] Field of Search ............................... 423/629, 625

[56] References Cited

U.S. PATENT DOCUMENTS

| 2,154,603 | 4/1939 | Bley ........................................ 423/629 |
| 3,887,691 | 6/1975 | Kobetz ..................................... 423/629 |
| 3,925,257 | 12/1975 | Horzepa et al. ........................ 423/625 |
| 4,275,052 | 6/1981 | Ryu ........................................ 423/628 |
| 4,532,072 | 7/1985 | Segal ...................................... 423/630 |

FOREIGN PATENT DOCUMENTS

| 0177198 | 9/1985 | European Pat. Off. . |
| 0314166 | 10/1988 | European Pat. Off. . |
| 0363910 | 10/1989 | European Pat. Off. . |
| 1518792 | 12/1965 | Germany . |
| 1767057 | 3/1968 | Germany . |
| 0135126 | 8/1983 | Japan .................................. 423/629 |
| 0103024 | 6/1985 | Japan .................................. 423/629 |
| 62-158116 | 7/1987 | Japan . |
| 1-059965 | 12/1989 | Japan . |
| 2-074522 | 3/1990 | Japan . |
| 2168334 | 6/1986 | United Kingdom .................. 423/629 |

OTHER PUBLICATIONS

J. Am. Ceram. Soc.,74[9] 2263–69 no month (1991), "*Prep. of Monodi . . .*", Ogihara, T, et al.
J. of Colloid and Interface Sci., 26,62–69 no month (1968), "Controlled Growth . . .", Stober, W.
Comm. Amer. Ceram. Soc. Dec. 1982 C–198–C201, "*Alternative Radwaste . . .*", Komarneni, S.
The Centen.Memo.Isue. . .1036–1046 no month (1991) "*Synth. of Ceram. Powd . . .*", The Ceramic Soc. of Japan, 99 (10), Messing, G., et al.
Ceram Bull., vol. 54, No. 3 no month 1975) 289–290, "*Alumina Sol Prep . . .*", Yoldas, B.

*Primary Examiner*—Steven Bos
*Attorney, Agent, or Firm*—Birch, Stewart, Kolasch & Birch

[57] ABSTRACT

Aluminum hydroxide containing no coarse particle is prepared by continuously supplying at least one compound selected from the group consisting of aluminum alkoxides and aluminum alkoxide derivatives which are prepared by chemically modifying aluminum alkoxides, and water under high shear rate stirring.

18 Claims, No Drawings

CONTINUOUS PROCESS FOR PREPARING ALUMINUM HYDROXIDE

BACKGROUND OF THE INVENTION

1. Field of the Invention

The present invention relates to a continuous process for preparing aluminum hydroxide. In particular, the present invention relates to a process for continuously preparing aluminum hydroxide which contains no coarse particles by hydrolysis of its precursor at high productivity in industry.

2. Description of the Related Art

Attention is paid to a hydrolysis of a metal alkoxide as a synthesis method of a sol, gel or fine particles which are precursors of ceramics because of advantages that:

(1) the metal alkoxide is easily hydrolyzed at room temperature to provide a hydroxide, and (2) there is no possibility that a product contains impurity anions (see Amer. Ceram. Soc. Bull., 54, 286 (1975) and Nippon Ceramic Kyokai Gakujutsu Ronbunshi, 99 (10), 1036–1046 (1991)).

When a silicon alkoxide or titanium alkoxide is used as a raw material, monodisperse spherical particles containing no coarse particle can be easily prepared by the hydrolysis (see, for example, J. Colloid and Interface Sci., 26, 62 (1968) and J. Am. Ceramic Soc., 65, C199 (1982)). But, when an aluminum alkoxide is used as a raw material, gel-form precipitate tends to form since the hydrolysis reaction rate is high, so that it is difficult to produce monodisperse particles having uniform particle size and containing no coarse particle.

Aluminum oxide which is prepared by calcining aluminum hydroxide is widely used as a sintering raw material, a filler and the like. For the purpose of excellent properties, aluminum oxide which has a narrow particle size distribution and is easily dispersed is desired.

In the synthesis of aluminum hydroxide by hydrolysis of an aluminum alkoxide, attempts have been made to prepare monodisperse particles under certain specific conditions (see Japanese Patent KOKAI Publication No. 158116/1987 and J. Am. Ceramic Soc., 74, 2263 (1991)).

Those approaches use the hydrolysis reaction at a low concentration of the raw material in a reaction medium to which a solvent other than an alcohol constituting the aluminum alkoxide is added. While the monodisperse particles containing no coarse particle can be prepared, the productivity is low in the industrial scale production. Further, when the alcohol used as the solvent is recycled to the synthesis of aluminum alkoxide, it should be purified.

SUMMARY OF THE INVENTION

An object of the present invention is to provide a process for preparing aluminum hydroxide in a fine particle form effectively containing no coarse particle by hydrolysis of its precursor, in particular, to provide a continuous process which is advantageous in industrial productivity.

According to the present invention, there is provided a continuous process for preparing aluminum hydroxide comprising continuously supplying at least one compound selected from the group consisting of aluminum alkoxides and aluminum oxide derivatives which are prepared by chemically modifying aluminum alkoxides, and water under high shear rate stirring.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

One of the important characteristics of the present invention is that the aluminum alkoxide and/or aluminum alkoxide derivative which is prepared by chemically modifying aluminum alkoxide, and water are continuously reacted under high shear rate stirring.

Herein, the stirring under high shear rate means stirring by mechanical energy such as shearing stress, pressure change, cavitation, collision force, potential core and the like, which are generated between a turbine or rotor rotating at a high peripheral speed of about 1 m/sec. to about 40 m/sec. and a stator or screen of a special mixer such as a homomixer or homogenizer, which comprises a specially designed turbine or rotor rotating at a high speed and a stator or screen provided around the turbine or rotor with a clearance of 2 mm or less.

Examples of such mixer for high shear rate stirring (hereinafter referred to as "high shear rate mixer") are T. K. Homomixer (manufactured by Tokushu Kika Kogyo Kabushikikaisha), Cleamix (manufactured by M Technique Kabushikikaisha), Polytron homogenizer and Megatron homogenizer (both manufactured by KINEMATICA), Supraton (manufactured by Tsukishma Kikai Kabushikikaisha), and the like.

The condition for high shear rate stirring can be expressed by a shear rate represented by the formula:

$$x/y \times 10^3 \text{ sec.}^{-1}$$

wherein x is a peripheral speed (m/sec.) of the turbine (rotor) which rotates at a high speed and y is a clearance (mm) between the turbine (rotor) and the stator (screen).

In the process of the present invention, the high shear rate stirring condition should generate a shear rate of usually at least 3000 sec.$^{-1}$ preferably at least 5000 sec.$^{-1}$, more preferably at least 8000 sec.$^{-1}$. When the shear rate is less than 3000 sec.$^{-1}$, mixing of the aluminum alkoxide and water and mechanical dispersion of the produced aluminum hydroxide particles are insufficient, so that the coarse particles tend to be formed.

When the aluminum alkoxide derivative which is prepared by chemically modifying the aluminum alkoxide (hereinafter referred to as "aluminum alkoxide derivative" or simply "said derivative") or a mixture of said derivative and the aluminum alkoxide is continuously supplied as the raw material together with water and hydrolyzed, finer aluminum hydroxide particles can be prepared.

In the process of the present invention, a residence time of the aluminum alkoxide and/or said derivative and water is usually from about 5 seconds to about 5 minutes, preferably from about 10 seconds to about 2 minutes. When the residence time in the stirring range is shorter than about 5 seconds, the reaction is not completed in the stirring range so that the particles discharged from the stirring range are polymerized or agglomerated, whereby the particles are reagglomerated or insufficiently dispersed. When the residence time in the stirring range is longer than about 5 minutes, the productivity may be decreased.

As for the continuous reactor, any type of continuous reactor such of a tank continuous type reactor or a pipe line continuous type reactor may be used.

The reaction in the tank continuous type reactor is carried out by continuously supplying the aluminum alkoxide and/or said derivative and water to a tank equipped with the high shear rate mixer and continuously discharging a reaction mixture in the same amount as that of the supplied liquid to synthesize the aluminum hydroxide particles.

The reaction in the pipe line continuous type reactor is carried out by supplying the aluminum alkoxide and/or said derivative and water to the high shear rate mixer installed in a pipe line.

Since the continuous reaction can achieve a higher productivity and make the particle precipitation conditions more uniform than a batchwise reaction, the aluminum hydroxide having the uniform particle size distribution and containing no coarse particle can be produced.

In the process of the present invention, a molar ratio of water to the aluminum alkoxide and/or said derivative (water/Al) is preferably from 1.5:1 to 6:1, more preferably from about 1.5:1 to about 5:1.

A degree of completeness of hydrolysis, and properties of the produced aluminum hydroxide such as crystal form depend on the molar ratio of water to the aluminum alkoxide and/or said derivative, and a type and amount of a chemical modifier. To make the properties of produced aluminum hydroxide uniform, it is preferred to carry out the reaction in the above molar ratio range.

To produce the aluminum hydroxide particles having a uniform crystal form, it is preferred to carry out the reaction at the constant molar ratio.

When the molar ratio of water to the aluminum alkoxide and/or said derivative in the hydrolysis step is less than 1.5:1, the hydrolysis may not proceed completely, so that a large number of unreacted alkoxyl groups remain in the produced aluminum hydroxide, consequently the alcohol recovery is decreased when aluminum hydroxide is synthesized from the aluminum alkoxide.

When the above molar ratio is larger than 6:1, though the hydrolysis is completed, a water concentration in the solvent (alcohol+water) of a resulting slurry after reaction increases. Therefore, when the aluminum hydroxide powder is separated from the solvent by evaporating the solvent from the slurry, the aluminum hydroxide particles tend to agglomerate strongly.

The aluminum alkoxide and/or said derivative is preferably used in the form of a solution in an alcohol (ROH) which forms the alkoxide.

The aluminum alkoxide and/or said derivative is a solid or a viscous liquid at room temperature. Therefore, it is preferable to use them in the form of a solution in view of handling easiness. It is preferred to use, as the solvent, an alcohol which forms the alkoxide, since it is not necessary to fractionally distillate or purify it when the recovered alcohol is recycled to the synthesis of the aluminum alkoxide.

The alcohol which forms the alkoxide is preferably an alcohol having 1 to 8 carbon atoms, more preferably 2 to 4 carbon atoms. Specific examples of the alcohol are ethanol, n-propanol, isopropanol, n-butanol, sec.-butanol, tert.-butanol, and the like.

As the aluminum alkoxide, one having the alkoxyl group corresponding to the above alcohol is used. Specific examples of the aluminum alkoxide are aluminum ethoxide, aluminum n-propoxide, aluminum isopropoxide, aluminum n-butoxide, aluminum sec.-butoxide, aluminum tert.-butoxide, and the like.

As the chemical modifier which forms the aluminum alkoxide derivative used in the process of the present invention, at least one compound selected from the group consisting of diketones, ketoesters, diesters, carboxylic acids, diols, ketoalcohols, aldehydes, amino acids, polyhydric alcohol acetates, amines and polyether is used. Specific examples of the chemical modifiers are diketones such as diacetyl, acetylbenzoyl, benzil, acetylacetone, benzoylacetone, dibenzoylmethane, trifluoroacetylacetone, hexa-fluoroacetylacetone, dipivaloylmethane, pivaloyltrifluoroacetone, and so on; ketoesters such as methyl acetoacetate, ethyl acetoacetate, and so on; diesters such as dimethyl malonate, diethyl malonate, dimethyl phthalate, diethyl phthalate, dibutyl phthalate, dioctyl phthalate, dioctyl adipate, diisodecyl adipate, dimethyl oxalate, diethyl oxalate, and so on; diols such as ethylene glycol, propylene glycol, trimethylene glycol, 1,3-butanediol, 1,4-butane-diol, 1,5-pentanediol, 1,6-hexanediol, hexylene glycol, heptanediol, octanediol, nonanediol, decanediol, pinacol, diethylene glycol, and so on; ketoalcohols such as acetol, acetoin, acetoethylalcohol, diacetone-alcohol, phenacylaclohol, benzoin, and so on; aldehydes such as salicylaldehyde, and so on; carboxylic acids such as formic acid, acetic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, heptadecylic acid, stearic acid, oxalic acid, citric acid, fumaric acid, iminodibutyric acid, octylic acid, oleic acid, and so on; amino acids such as glycin; polyhydric alcohol acetates such as diethylene glycol monoethylether acetate, diethylene glycol monobutylether acetate, and so on; amines such as ethylenediamine, diethylenetriamine, triethylenetetramine, diethanolamine, triethanolamine, ethylenediamine tetracetate, and so on; and polyethers such as diethylene glycol monomethyl ether, diethylene glycol dimethyl ether, diethylene glycol monoethyl ether, diethylene glycol diethyl ether, diethylene glycol dibutyl ether, triethylene glycol dimethylether, tetraethylene glycol dimethyl ether, ethylcellosolve, dodecanediol dimethyl ether, decanediol dimethyl ether, hexanediol dimethyl ether, hexanediol diethyl ether, diethylene glycol monobutyl ether, dipropylene glycol dimethyl ether, diethylene glycol butylmethyl ether, and so on.

The aluminum alkoxide derivative may be prepared, for example, by mixing a mixture of the chemical modifier and the alkoxide-forming alcohol together with a mixture of the aluminum alkoxide and said alcohol at a temperature from room temperature to a boiling point of the solvent and aging the reaction mixture for about one hour.

A molar ratio of the aluminum alkoxide to the chemical modifier is usually at least 1:3, preferably from 1:1 to 30:1.

A concentration of the solution containing the aluminum alkoxide and/or said derivative is not uniformly defined because of the solubility of such compound in the solvent. Usually, the concentration is from about 30 to about 90% by weight. When the concentration is less than about 30% by weight, a concentration of the resulting slurry of aluminum hydroxide may be low, so that a larger amount of alcohol should be evaporated off to obtain the aluminum hydroxide powder from the slurry. When the concentration exceeds about 90% by weight, some alkoxides having low solubility tend to precipitate. In addition, since the concentration of the slurry of aluminum hydroxide during and after hydrolysis becomes high, the aluminum hydroxide particles tend to reagglomerate.

A concentration of water to be used for hydrolysis is not critical. Water may be used as a solution of the alkoxide-forming alcohol.

A reaction temperature is not limited. Usually, the reaction is carried out in a temperature range from room temperature to the boiling temperature of the solvent.

A reaction pressure is preferably 0.1 kgG/cm$^2$ or higher. When the reaction pressure is lower than 0.1 kgG/cm$^2$, bubbles tend to be trapped under the high shear rate stirring condition, which may increase the mechanical energy loss.

To improve the dispersion of precipitated particles and prevent agglomeration of the particles, a surface charge regulator such as an acid or a base, or a surfactant such as a dispersant or an emulsifier may be added.

Examples of the acid are hydrochloric acid, nitric acid, acetic acid, and the like, and examples of the base are ammonia, triethylamine, and the like. Examples of the surfactant are nonionic surfactants such as sorbitan monooleate, sorbitan trioleate, sorbitan monolaurate, triolein, polyoxyethylene phenyl ether, and so on; anionic surfactants such as sodium alkyldiphenyldisulfonate, sodium salt of dialkylsulfosuccinate, and so on; cationic surfactants such as N-alkyltrimethylenediamine oleate, and so on.

Aluminum hydroxide prepared by the process of the present invention can be recovered in the form of powder from the slurry by any of conventional solid-liquid separation means such as evaporation, drying and filtration, and used as a filler for various resins and paper.

Herein, the term "aluminum hydroxide" is intended to mean not only aluminum hydroxide as such which is prepared by the hydrolysis of aluminum alkoxide but also aluminum hydroxide to which the chemical modifier is bonded or which contains the unreacted group.

When aluminum hydroxide is calcined at a temperature of about 700° C. to about 1100° C., transition alumina such as γ-, δ- and θ-aluminas are obtained. The transition alumina is preferably used as a filler for various resins such as PET films or epoxy resins, a coating filler of paper for ink jet printing, a carrier of catalysts, or a raw material for single crystallization.

When aluminum hydroxide is calcined at a temperature of about 1100° C. to about 1400° C., α-alumina is obtained, which is suitable as an abrasive or a raw material for sintering.

As explained above, when the hydrolysis of the aluminum alkoxide and/or said derivative is continuously carried out under the above specific stirring condition, it is possible to produce the aluminum hydroxide particles having an average particle size (a particle size at 50% cumulation) of about 7 μm or less, preferably about 5 μm or less and the particle size at 90% cumulation of about 15 μm or less, preferably about 10 μm or less and containing no or little coarse agglomerated particle with high productivity.

The particle size is measured by the MICROTRACK MK II particle size analyzer (manufactured by Nikkiso Kabushikikaisha).

PREFERRED EMBODIMENTS OF THE INVENTION

The present invention will be illustrated by the following Examples.

In the following Examples, the crystal form and particle sizes D50 (particle size at 50% cumulation) and D90 (particle size at 90% cumulation) were measured as follows:

Crystal form:

The crystal form was measured using a powder X-ray diffraction apparatus (Geiger Flex RAD Series manufactured by Rigaku Denki Kogyo Kabushikikaisha).

Particle size:

The particle size is measured by the MICROTRACK MK II particle size analyzer (SPA Model 7997-20 manufactured by Nikkiso Kabushikikaisha).

EXAMPLE 1

In a 35 cc pressure vessel which was resistant to 2 kg/cm2 (working pressure: 0.2 kg/cm$^2$), there was equipped a high shear rate mixer Cleamix CLM-L 2.5 S (manufactured by M Technique Kabushikikaisha) having a rotor of 29 mm in maximum diameter and 11 mm in minimum diameter with a clearance of 0.3 mm. At a shear rate of 33,400 to 88,000 sec.$^{-1}$, a mixture of 75% by weight of aluminum isopropoxide and isopropanol and a mixture of 30% by weight of water and isopropanol were continuously supplied in the mixer for a residence time of 15 seconds at a molar ratio of water to aluminum isopropoxide of 2.0:1 and hydrolyzed at a temperature of 40° to 70° C. to obtain aluminum hydroxide, which was amorphous and had D50 of 3.1 μm and D90 of 5.3 μm.

COMPARATIVE EXAMPLE 1

In a 2 liter separable flask, there was equipped a stirrer having stirring blades having the maximum diameter of 145 mm and the minimum diameter of 10 mm which were designed so that a clearance between the inner flask wall and the blade tips was about 5 mm. Then, the same mixtures as those used in Example 1 were supplied at the same ratio of water to aluminum isopropoxide as in Example 1 and hydrolyzed at a temperature of 40° to 70° C. for 60 minutes while rotating the stirring blades at 100 rpm (corresponding to the shear rate of 10 sec.$^{-1}$ to about 150 sec.$^{-1}$) to obtain aluminum hydroxide, which was amorphous and had D50 of 9.9 μm and D90 of 21.6 μm.

EXAMPLES 2, 3 AND 4

In the same manner as in Example 1 except that the molar ratio of water to aluminum isopropoxide was changed to 2.7:1 and the residence time was adjusted to 15 seconds (Example 2), 30 seconds (Example 3) or 1 minute (Example 4), aluminum isopropoxide was hydrolyzed to obtain aluminum hydroxide, which was amorphous and had D50 of 2.6 μm and D90 of 4.8 μm in Example 2, D50 of 2.7 μm and D90 of 4.8 μm in Example 3, or D50 of 2.8 μm and D90 of 5.0 μm in Example 4.

EXAMPLES 5, 6 AND 7

In the same manner as in Example 4 except that, in place of the mixture of 75% by weight of aluminum isopropoxide and isopropanol, there was used a mixture of 60% by weight of a mixture of unmodified aluminum isopropoxide and aluminum isopropoxide which was chemically modified with ethyl acetoacetate and isopropanol, which was prepared by mixing the mixture of 75% by weight of aluminum isopropoxide and isopropanol and a mixture of ethyl acetoacetate and isopropanol at a molar ratio of aluminum isopropoxide to ethyl acetoacetate of 5:1 (Example 5), 10:1 (Example 6) or 20 (Example 7), aluminum isopropoxide was hydrolyzed to obtain aluminum hydroxide, which was amorphous and had D50 of 1.0 μm and D90 of 2.8 μm in Example 5, D50 of 1.4 μm and D90 of 3.0 μm in Example 6, or D50 of 2.2 μm and D90 of 3.9 μm in Example 7.

COMPARATIVE EXAMPLES 2 AND 3

In the same manner as in Comparative Example 1 except that the molar ratio of water to aluminum isopropoxide was changed to 1.5:1 and a mixture of 60% by weight of a mixture of unmodified aluminum isopropoxide and aluminum isopropoxide which was chemically modified with ethyl acetoacetate, which was prepared by mixing the mixture of 75% by weight of aluminum isopropoxide and isopropanol and a mixture of ethyl acetoacetate and isopropanol at a molar ratio of aluminum isopropoxide to ethyl acetoacetate of 5:1 (Comparative Example 2) or 10:1 (Comparative Example 3), aluminum isopropoxide was hydrolyzed to obtain aluminum hydroxide, which was amorphous and had D50 of 8.6 μm and D90 of 17.8 μm in Comparative Example 2, or D50 of 9.2 μm and D90 of 20.5 μm in Comparative Example 3.

EXAMPLE 8

In the same manner as in Example 4 except that a mixture of 30% by weight of aluminum isopropoxide and isopropanol was used, aluminum isopropoxide was hydrolyzed to obtain aluminum hydroxide, which was amorphous and had D50 of 3.6 μm and D90 of 7.0 μm.

EXAMPLES 9 AND 10

In the same manner as in Example 4 except that the shear rate was changed to the range between 9600 and 25,300 sec.−1 (Example 9) or the range between 19,200 and 50,600 sec.−1, aluminum isopropoxide was hydrolyzed to obtain aluminum hydroxide, which was amorphous and had D50 of 4.6 μm and D90 of 8.1 μm in Example 9, or D50 of 3.7 μm and D90 of 6.7 μm in Example 10.

EXAMPLE 11

In the same manner as in Example 4 except that the molar ratio of water to aluminum isopropoxide was changed to 3.0:1, aluminum isopropoxide was hydrolyzed to obtain aluminum hydroxide, which had a crystal form of pseudo-boehmite, and D50 of 3.1 μm and D90 of 5.5 μm.

EXAMPLE 12

In the same manner as in Example 4 except that the molar ratio of water to aluminum isopropoxide was changed to 4.0:1 and the residence time in the stirring rage was changed to 2 minutes, aluminum isopropoxide was hydrolyzed to obtain aluminum hydroxide, which had a crystal form of pseudo-boehmite, and D50 of 2.4 μm and D90 of 4.2 μm.

EXAMPLE 13

In the same manner as in Example 4 except that a mixture of 75% by weight of aluminum sec.-butoxide and sec.-butanol and a mixture of 30% by weight of water and sec.-butanol were used in place of the mixture of 75% by weight of aluminum isopropoxide and isopropanol and the mixture of 30% by weight of water and isopropanol, respectively, and a molar ratio of water to aluminum sec.-butoxide was 2.5, aluminum sec.-butoxide was hydrolyzed to obtain aluminum hydroxide, which was amorphous and had D50 of 2.5 μm and D90 of 4.5 μm.

EXAMPLE 14

In the same manner as in Example 13 except that the molar ratio of water to aluminum sec.-butoxide was changed to 3.0:1, aluminum sec.-butoxide was hydrolyzed to obtain aluminum hydroxide, which had a crystal form of pseudo-boehmite, and D50 of 2.8 μm and D90 of 4.9 μm.

EXAMPLE 15

In the same manner as in Example 5 except that, in the pressure vessel, a high shear rate mixer Cleamix CLM-0.8 S (manufactured by M Technique Kabushikikaisha) having a rotor of 29 mm in maximum diameter and 11 mm in minimum diameter was installed with leaving a clearance of 0.2 mm, the shear rate was changed to the range between 43,200 sec.$^{-1}$ and 114,000 sec.$^{-1}$, and the molar ratio of water to aluminum isopropoxide was changed to 3.5:1, aluminum isopropoxide was hydrolyzed to obtain aluminum hydroxide, which was amorphous and had D50 of 0.57 μm and D90 of 1.33 μm.

EXAMPLE 16

In the same manner as in Example 5 except that, as the aluminum alkoxide mixture, there was used a mixture of 60% by weight of a mixture of unmodified aluminum isopropoxide and aluminum isopropoxide which was chemically modified with triethanolamine and isopropanol, which was prepared by mixing the mixture of 75% by weight of aluminum isopropoxide and isopropanol and a mixture of triethanolamine and isopropanol at a molar ratio of aluminum isopropoxide to ethanolamine of 5:1, and the shear rate was changed to the range between 43,200 sec.$^{-1}$ and 114,000 sec.$^{-1}$, aluminum isopropoxide was hydrolyzed to obtain aluminum hydroxide, which was amorphous and had D50 of 0.83 μm and D90 of 3.51 μm.

EXAMPLE 17

In the same manner as in Example 5 except that, as the aluminum alkoxide mixture, there was used a mixture of 60% by weight of a mixture of unmodified aluminum isopropoxide and aluminum isopropoxide which was chemically modified with methyl acetoacetate and isopropanol, which was prepared by mixing the mixture of 75% by weight of aluminum isopropoxide and isopropanol and a mixture of methyl acetoacetate and isopropanol at a molar ratio of aluminum isopropoxide to methyl acetoacetate of 5:1, and the shear rate was changed to the range between 43,200 sec.$^{-1}$ and 114,000 sec.$^{-1}$, aluminum isopropoxide was hydrolyzed to obtain aluminum hydroxide, which was amorphous and had D50 of 0.70 μm and D90 of 1.60 μm.

EXAMPLE 18

In the same manner as in Example 5 except that, as the aluminum alkoxide mixture, there was used a mixture of 60% by weight of a mixture of unmodified aluminum isopropoxide and aluminum isopropoxide which was chemically modified with hexylene glycol and isopropanol, which was prepared by mixing the mixture of 75% by weight of aluminum isopropoxide and isopropanol and a mixture of hexylene glycol and isopropanol at a molar ratio of aluminum isopropoxide to hexylene glycol of 5:1, and the shear rate was changed to the range between 43,200 sec.$^{-1}$ and 114,000 sec.$^{-1}$, aluminum isopropoxide was hydrolyzed to obtain aluminum hydroxide, which was amorphous and had D50 of 2.47 μm and D90 of 4.22 μm.

EXAMPLE 19

In the same manner as in Example 5 except that, as the aluminum alkoxide mixture, there was used a mixture of 60% by weight of a mixture of unmodified aluminum isopropoxide and aluminum isopropoxide which was chemically modified with dibutyl phthalate and isopropanol, which was prepared by mixing the mixture of 75% by weight of aluminum isopropoxide and isopropanol and a mixture of dibutyl phthalate and isopropanol at a molar ratio of aluminum isopropoxide to dibutyl phthalate of 5:1, and the shear rate was changed to the range between 43,200 sec.$^{-1}$ and 114,000 sec.$^{-1}$, aluminum isopropoxide was hydrolyzed to obtain aluminum hydroxide, which was amorphous and had D50 of 2.20 μm and D90 of 3.64 μm.

EXAMPLE 20

In the same manner as in Example 5 except that, as the aluminum alkoxide mixture, there was used a mixture of 60% by weight of a mixture of unmodified aluminum isopropoxide and aluminum isopropoxide which was chemically modified with lauric acid and isopropanol, which was prepared by mixing the mixture of 75% by weight of aluminum isopropoxide and isopropanol and a mixture of lauric acid and isopropanol at a molar ratio of aluminum isopropoxide to lauric acid of 5:1, and the shear rate was changed to the range between 43,200 sec.$^{-1}$ and 114,000 sec.$^{-1}$, aluminum isopropoxide was hydrolyzed to obtain aluminum hydroxide, which was amorphous and had D50 of 2.09 μm and D90 of 3.54 μm.

EXAMPLE 21

In the same manner as in Example 5 except that, as the aluminum alkoxide mixture, there was used a mixture of 60% by weight of a mixture of unmodified aluminum isopropoxide and aluminum isopropoxide which was chemically modified with ethylene diamine and isopropanol, which was prepared by mixing the mixture of 75% by weight of aluminum isopropoxide and isopropanol and a mixture of ethylene diamine and isopropanol at a molar ratio of aluminum isopropoxide to ethylene diamine of 5:1, and the shear rate was changed to the range between 43,200 sec.$^{-1}$ and 114,000 sec.$^{-1}$, aluminum isopropoxide was hydrolyzed to obtain aluminum hydroxide, which was amorphous and had D50 of 1.86 μm and D90 of 3.97 μm.

EXAMPLE 22

In the same manner as in Example 5 except that, as the aluminum alkoxide mixture, there was used a mixture of 60% by weight of a mixture of unmodified aluminum isopropoxide and aluminum isopropoxide which was chemically modified with diethylene glycol and isopropanol, which was prepared by mixing the mixture of 75% by weight of aluminum isopropoxide and isopropanol and a mixture of diethylene glycol and isopropanol at a molar ratio of aluminum isopropoxide to diethylene glycol of 5:1, and the shear rate was changed to the range between 43,200 sec.$^{-1}$ and 114,000 sec.$^{-1}$, aluminum isopropoxide was hydrolyzed to obtain aluminum hydroxide, which was amorphous and had D50 of 2.27 μm and D90 of 4.22 μm.

EXAMPLE 23

In the same manner as in Example 5 except that, as the aluminum alkoxide mixture, there was used a mixture of 60% by weight of a mixture of unmodified aluminum isopropoxide and aluminum isopropoxide which was chemically modified with octylic acid and isopropanol, which was prepared by mixing the mixture of 75% by weight of aluminum isopropoxide and isopropanol and a mixture of octylic acid and isopropanol at a molar ratio of aluminum isopropoxide to octylic acid of 5:1, and the shear rate was changed to the range between 43,200 sec.$^{-1}$ and 114,000 sec.$^{-1}$, aluminum isopropoxide was hydrolyzed to obtain aluminum hydroxide, which was amorphous and had D50 of 2.08 μm and D90 of 3.73 μm.

EXAMPLE 24

In the same manner as in Example 5 except that, as the aluminum alkoxide mixture, there was used a mixture of 60% by weight of a mixture of unmodified aluminum isopropoxide and aluminum isopropoxide which was chemically modified with oleic acid and isopropanol, which was prepared by mixing the mixture of 75% by weight of aluminum isopropoxide and isopropanol and a mixture of oleic acid and isopropanol at a molar ratio of aluminum isopropoxide to oleic acid of 5:1, and the shear rate was changed to the range between 43,200 sec.$^{-1}$ and 114,000 sec.$^{-1}$, aluminum isopropoxide was hydrolyzed to obtain aluminum hydroxide, which was amorphous and had D50 of 2.16 μm and D90 of 4.19 μm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A continuous process for preparing aluminum hydroxide comprising continuously supplying water and at least one compound selected from the group consisting of aluminum alkoxides and aluminum alkoxide derivatives which are prepared by chemically modifying aluminum alkoxides with at least one compound selected from the group consisting of diketones, ketoesters, diesters, carboxylic acids, diols, ketoalcohols, aldehydes, amino acids, polyhydric alcohol acetates, amines and polyethers, to a mixer which is stirring at a shear rate of at least 3000 sec$^{-1}$, said mixer selected from the group consisting of a mixer which comprises a turbine and a stator provided around said turbine and a mixer which comprises a rotor and a screen provided around said rotor and recovering aluminum hydroxide particles having an average particle size, D50, of about 7 microns or less.

2. The continuous process according to claim 1, wherein a molar ratio of water to said aluminum alkoxide or aluminum alkoxide derivative is from 1.5:1 to 6:1.

3. The continuous process according to claim 1, wherein water and said aluminum alkoxide or aluminum alkoxide derivative is reacted for a residence time from 5 seconds to 5 minutes.

4. The continuous process according to claim 1, wherein a molar ratio of water to said aluminum alkoxide or aluminum alkoxide derivative remains constant during said continuous process.

5. The continuous process according to claim 1, wherein said at least one compound is an aluminum alkoxide.

6. The continuous process according to claim 1, wherein said at least one compound is an aluminum alkoxide derivative or a mixture of an aluminum alkoxide and an aluminum alkoxide derivative.

7. The continuous process according to claim 1, wherein said at least one compound is an aluminum alkoxide derivative which is prepared by modifying an aluminum alkoxide with at least one compound selected from the group consisting of diketones, ketoesters, diesters, carboxylic acids, diols, ketoalcohols, aldehydes, amino acids, polyhydric alcohol acetates, amines and polyethers, or a mixture of an aluminum alkoxide and said aluminum alkoxide derivative.

8. The continuous process according to claim 1, wherein the shear rate is at least 5000 sec.$^{-1}$.

9. The continuous process according to claim 1, wherein the shear rate is at least 8000 sec.$^{-1}$.

10. The continuous process according to claim 1, wherein water and said aluminum alkoxide or aluminum alkoxide derivative are reacted for a residence time from about 10 seconds to about 2 minutes.

11. The continuous process according to claim 1, further comprising continuously discharging the reaction mixture at a rate that is the same as the rate of the supplying of said water and aluminum alkoxide or derivative.

12. The continuous process according to claim 1, wherein said water and said aluminum alkoxide or derivative are present in a molar ratio of water to aluminum alkoxide or derivative from about 1.5:1 to about 5:1.

13. The continuous process according to claim 1, wherein said aluminum alkoxide or aluminum alkoxide derivative is in the form of a solution.

14. The continuous process according to claim 1, wherein said aluminum alkoxide is formed from an alcohol having 1 to 8 carbon atoms.

15. The continuous process according to claim 1, wherein said aluminum alkoxide is formed from an alcohol having 2 to 4 carbon atoms.

16. The continuous process according to claim 1, wherein said aluminum alkoxide is selected from a group consisting of aluminum ethoxide, aluminum n-propoxide, aluminum isopropoxide, aluminum n-butoxide, aluminum sec.-butoxide, and aluminum tert.-butoxide.

17. The continuous process according to claim 1, wherein said aluminum alkoxide derivative is prepared by (1) forming a first mixture of a chemical modifier and an alkoxide-forming alcohol, (2) forming a second mixture of aluminum alkoxide and said alcohol, and (3) mixing said first and said second mixtures to form a reaction mixture at a temperature from room temperature to the boiling point of said alcohol and aging the reaction mixture.

18. The process according to claim 17, wherein the molar ratio of said aluminum alkoxide to the chemical modifier is from 1:1 to 30:1.

* * * * *